United States Patent
Sakai

(10) Patent No.: US 10,848,049 B2
(45) Date of Patent: Nov. 24, 2020

(54) MAIN CONVERSION CIRCUIT, POWER CONVERSION DEVICE, AND MOVING BODY

(71) Applicant: Mitsubishi Electric Corporation, Tokyo (JP)

(72) Inventor: Junya Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/462,127

(22) PCT Filed: Mar. 8, 2017

(86) PCT No.: PCT/JP2017/009239
§ 371 (c)(1),
(2) Date: May 17, 2019

(87) PCT Pub. No.: WO2018/163320
PCT Pub. Date: Sep. 13, 2018

(65) Prior Publication Data
US 2020/0321851 A1 Oct. 8, 2020

(51) Int. Cl.
*H02M 1/088* (2006.01)
*H02M 7/537* (2006.01)

(52) U.S. Cl.
CPC .......... *H02M 1/088* (2013.01); *H02M 7/537* (2013.01)

(58) Field of Classification Search
CPC ........ H02M 1/08; H02M 1/083; H02M 1/088; H02M 7/53; H02M 7/537; H02M 7/5387
See application file for complete search history.

(56) References Cited

U.S. PATENT DOCUMENTS

| 2015/0326156 A1* | 11/2015 | Kanzaki | H02M 1/32 318/400.21 |
| 2018/0248492 A1* | 8/2018 | Kondo | H01L 29/00 |
| 2019/0149145 A1* | 5/2019 | Yang | H03K 17/0406 318/139 |
| 2020/0185906 A1* | 6/2020 | Laven | H01L 29/0619 |

FOREIGN PATENT DOCUMENTS

| JP | 2004-229382 A | 8/2004 |
| JP | 2008-178248 A | 7/2008 |

OTHER PUBLICATIONS

International Search Report; Written Opinion; and Notification of Transmittal of the International Search Report and the Written Opinion of the International Searching Authority, or the Declaration issued in PCT/JP2017/009239; dated Apr. 11, 2017.

* cited by examiner

*Primary Examiner* — Emily P Pham
(74) *Attorney, Agent, or Firm* — Studebaker & Brackett PC

(57) ABSTRACT

A plurality of semiconductor devices (1) are connected in parallel with each other. A gate driver (13) supplies a gate voltage to gates of the plurality of semiconductor devices (1). A gate wire (14,16) are sequentially connected to the gates of the plurality of semiconductor devices (1) from the gate driver (13). An energizing ability of each of the semiconductor devices (1) indicates how easily collector current flows in response to the supplied gate voltage. The plurality of semiconductor devices (1) having a lower energizing ability are connected closer to the gate driver (13).

8 Claims, 4 Drawing Sheets

MAIN CONVERSION CIRCUIT, POWER CONVERSION DEVICE, AND MOVING BODY

FIELD

The present invention relates to a main conversion circuit, a power conversion device, and a moving body.

BACKGROUND

As the generations of main conversion circuits go by, it becomes indispensable to upsize an available current capacity. As one of the methods for upsizing the current capacity, there is a method which uses semiconductor devices connected in parallel. Since a current amount can be determined on a circuit design side regardless of a lineup of products, the semiconductor devices connected in parallel are increasing in recent years. When any one of the semiconductor devices connected in parallel reaches the end of service life, that becomes the end of the service life of the main conversion circuit. When loads (such as currents) applied to the semiconductor devices are unbalanced, the service life also becomes unbalanced, which causes a concern that the service life of the main conversion circuit is shortened.

In order to secure an insulation distance, a plurality of semiconductor devices are aligned in the same direction, with a gate driver being placed at the end of either right or left side of the aligned semiconductor devices. Therefore, when the plurality of semiconductor devices are driven with a single gate driver, a difference in distance and wire length is generated between each of the semiconductor devices and the gate driver. The semiconductor devices having a closer wiring distance to the gate driver receive a larger applied gate voltage and conduct current more easily. Since large loads are applied to the semiconductor devices that conduct current more easily, it is concerned that the service life is shortened.

Accordingly, it is proposed to prepare gate drivers for the respective semiconductor devices connected in parallel and individually adjust the gate drivers such that a higher gate voltage is applied to a device higher in gate threshold voltage for suppressing the unbalance of loads applied to the devices (see, for example, Patent Literature 1). It is also proposed to add a collector current recognition function to the semiconductor devices to detect a current unbalance and apply a positive offset to a gate threshold voltage of the semiconductor devices which are low in current amount for suppressing the current unbalance (see, for example, Patent Literature 2).

CITATION LIST

Patent Literature

[PTL 1] JP 2008-178248 A
[PTL 2] JP 2004-229382 A

SUMMARY

Technical Problem

However, in the conventional techniques, it is necessary to prepare a plurality of gate drivers or connect an additional circuit to transistors, which causes a problem of upsizing and complication of the devices.

The present invention has been made to solve the problems as described above, and it is an object of the present invention to provide a main conversion circuit, a power conversion device, and a moving body capable of enhancing electrical performance and reliability, while avoiding upsizing and complication of devices.

Solution to Problem

A main conversion circuit according to the present invention includes: a plurality of semiconductor devices connected in parallel with each other; a gate driver supplying a gate voltage to gates of the plurality of semiconductor devices; and a gate wire sequentially connected to the gates of the plurality of semiconductor devices from the gate driver, wherein an energizing ability of each of the semiconductor devices indicates how easily collector current flows in response to the supplied gate voltage, and the plurality of semiconductor devices having a lower energizing ability are connected closer to the gate driver.

Advantageous Effects of Invention

In the present invention, the plurality of semiconductor devices having a lower energizing ability are connected closer to the gate driver. As a result, it is possible to enhance electrical performance and reliability, while avoiding upsizing and complication of the devices.

DESCRIPTION OF EMBODIMENTS

A main conversion circuit, a power conversion device, and a moving body according to the embodiments of the present invention will be described with reference to the drawings. The same components will be denoted by the same symbols, and the repeated description thereof may be omitted.

Embodiment 1

Figure 1:
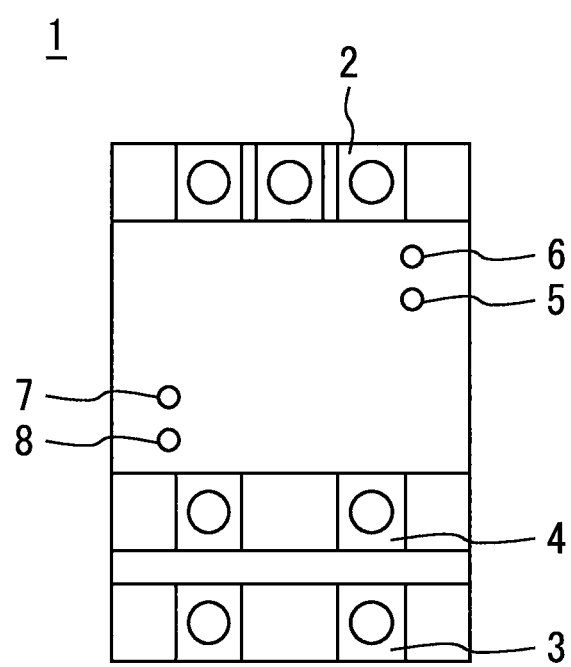
FIG. 1 is a plan view showing a semiconductor device according to an embodiment 1 of the present invention.

FIG. 1 is a plan view showing a semiconductor device according to an embodiment 1 of the present invention. The semiconductor device 1 incorporates a MOS transistor. In the semiconductor device 1, an AC output terminal 2 is provided in one end in a longitudinal direction of a casing, and a positive voltage input terminal 3 and a negative voltage input terminal 4 are provided in the other end. The positive voltage input terminal 3 is a high voltage-side main terminal, and the negative voltage input terminal 4 is a ground-side main terminal. Between these terminals, a high voltage-side gate terminal 5, a high voltage-side emitter auxiliary terminal 6, a low voltage-side gate terminal 7, and a low voltage-side emitter auxiliary terminal 8 are provided.

Figure 2:
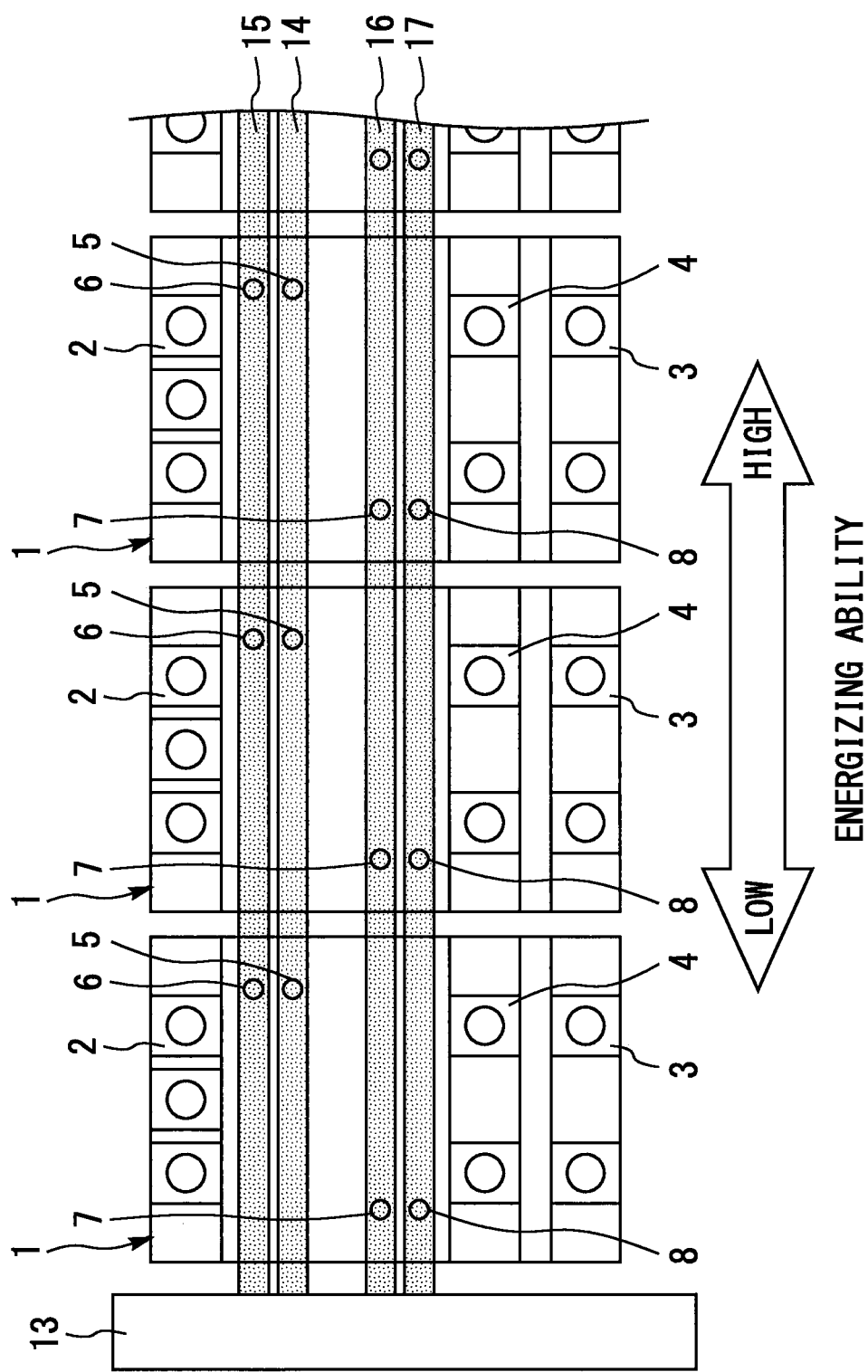
FIG. 2 is a plan view showing a main conversion circuit according to the embodiment 1 of the present invention.
Figure 3:
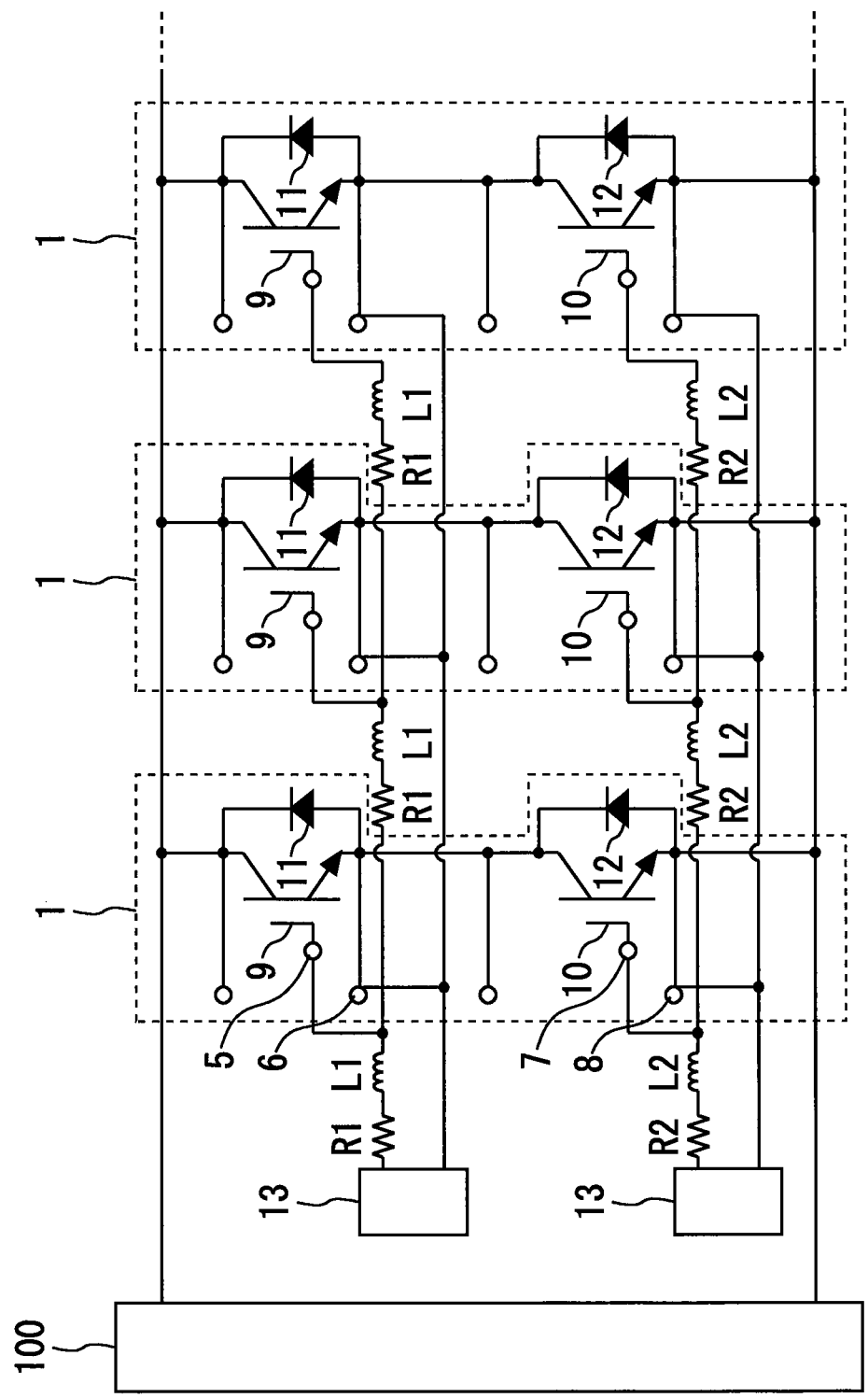
FIG. 3 is a circuit diagram showing the main conversion circuit according to the embodiment 1 of the present invention.

FIG. 2 is a plan view showing a main conversion circuit according to the embodiment 1 of the present invention. FIG. 3 is a circuit diagram showing the main conversion circuit according to the embodiment 1 of the present invention. Due to restrictions of a space insulation distance and a surface insulation distance, a plurality of semiconductor devices 1 are aligned in the same direction. Each of the semiconductor devices 1 has transistors 9 and 10, and reflux diodes 11 and 12. The transistors 9 of the plurality of semiconductor devices 1 are connected in parallel with each other. Similarly, the transistors 10 of the plurality of semiconductor devices 1 are also connected in parallel with each other.

A gate driver 13 supplies a gate voltage to the gates of the plurality of semiconductor devices 1. The gate driver 13 is positioned at the end of either right or left side of the aligned semiconductor devices 1. A high voltage-side gate wire 14 is sequentially connected to the high voltage-side gate terminals 5 of the plurality of semiconductor devices 1 from the gate driver 13. A high voltage-side emitter wire 15 is sequentially connected to the high voltage-side emitter auxiliary terminals 6 of the plurality of semiconductor devices 1. A low voltage-side gate wire 16 is sequentially connected to the low voltage-side gate terminals 7 of the plurality of semiconductor devices 1. A low voltage-side emitter wire 17 is sequentially connected to the low voltage-side emitter auxiliary terminals 8 of the plurality of semiconductor devices 1. The high voltage-side gate wire 14 has an inductor L1 and a resistor R1 between the gate driver 13 and the semiconductor devices 1 and between the adjacent semiconductor devices 1, respectively. The low voltage-side gate wire 16 has an inductor L2 and a resistor R2 between the gate driver 13 and the semiconductor devices 1 and between the adjacent semiconductor devices 1, respectively.

The plurality of semiconductor devices 1 having a lower energizing ability are connected closer to the gate driver 13. Here, the energizing ability of each of the transistors 9 indicates how easily collector current flows in response to a supplied gate voltage. However, attention may be paid to the characteristics of either one of two transistors 9 and 10 included in each of the semiconductor devices 1. Since the transistors 9 and 10 included in the same semiconductor device 1 generally have similar characteristics, the same effect can be achieved regardless of which characteristics attention is paid to. Attention may also be paid to the average of the characteristics of the two transistors 9 and 10.

In the present embodiment, the plurality of semiconductor devices 1 having a lower energizing ability are connected closer to the gate driver 13. Therefore, the transistors 9 having a lower energizing ability is shorter in wiring distance from the gate driver 13, so that resistance between the gate driver 13 and gates becomes smaller. Accordingly, a larger gate voltage is supplied to the transistors 9 having a lower energizing ability. Therefore, it is possible to suppress the unbalance of current which flows into the plurality of semiconductor devices 1 connected in parallel without adding another circuit. This switching unbalance measure suppresses deviation of the service life of the plurality of semiconductor devices 1 connected in parallel, and the service life of the main conversion circuit becomes longer than that of a conventional configuration. As a result, it is possible to enhance electrical performance and reliability, while avoiding upsizing and complication of the devices.

For example, a collector-emitter saturation voltage VCE (sat) can be used as the energizing ability. The VCE(sat) is a voltage between a collector and an emitter when rated current is fed to the transistor 9. In this case, the plurality of semiconductor devices 1 having a larger VCE(sat) are connected closer to the gate driver 13. Accordingly, a larger gate voltage is supplied to the transistors having a larger VCE(sat). Therefore, the VCE(sat) of the plurality of semiconductor devices 1 connected in parallel is balanced, so that the current unbalance can be suppressed. In the case of a main conversion circuit for electric railroads, the VCE(sat) can often be obtained for every device, and therefore arrangement of the devices can be determined relatively easily. Use of the VCE(sat) is most effective for suppressing current unbalance during regular operation. In the case of targeting enhancement in reliability of the main conversion circuit, it is desirable to use this parameter.

As the energizing ability, a gate threshold voltage VGE (th) can also be used. The VGE(th) is a gate voltage necessary for feeding 1/10000 of rated current in the state where prescribed voltage is applied across the collector and the emitter. In this case, the plurality of semiconductor devices 1 having a larger VGE(th) are connected closer to the gate driver 13. Accordingly, a larger gate voltage is supplied to the transistors having a larger VGE(th). Therefore, a VGE(th)–VGE difference among the plurality of semiconductor devices 1 connected in parallel is balanced, which makes it possible to suppress the unbalance of the current and saturation current amounts. By paying attention to this parameter, the unbalance of the amount of saturation current is suppressed, and therefore the unbalance of short-circuit tolerance is suppressed. This makes it possible to achieve enhancement in device reliability at the time of circuit malfunction. Therefore, this parameter is suitable for consumer electric railroads.

As the energizing ability, a conduction start time delay tdon can also be used. The tdon is a delay time after a prescribed gate voltage is applied to the transistors until a prescribed current amount starts to flow. In this case, the plurality of semiconductor devices 1 having a larger tdon are connected closer to the gate driver 13. Accordingly, a larger gate voltage is supplied to the transistors having a larger tdon. Therefore, the unbalance of tdon in the plurality of semiconductor devices 1 connected in parallel can be suppressed, which makes it possible to avoid that the current concentrates on some of the transistors at the time of starting conduction. It is also possible to suppress dead time unbalance among the semiconductor devices. Accordingly, this parameter is suitable for conversion circuits (such as SIV) assumed to perform high-speed operation.

The plurality of semiconductor devices 1 are not limited to those formed of silicon, but may be formed of wide-band gap semiconductors larger in band gap than silicon. The wide-band gap semiconductors are, for example, silicon carbide, gallium nitride-based materials, or diamond.

Since silicon carbide devices have faster switching speed than silicon devices, current unbalance and electromagnetic noise tend to occur. Therefore, in the conventional techniques which require a plurality of gate drivers or an additional circuit, a noise countermeasure which is stricter than that of the silicon devices is needed. Meanwhile, in the present embodiment, even when the silicon carbide devices are used, a single gate driver may be used, so that an additional circuit is unnecessary.

A power semiconductor device formed of such a wide-bandgap semiconductor has a high voltage resistance and a high allowable current density, and thus can be miniaturized. The use of such a miniaturized device enables the miniaturization and high integration of the semiconductor module in which the device is incorporated. Further, since the device has a high heat resistance, a radiation fin of a heatsink can be miniaturized and a water-cooled part can be air-cooled, which leads to further miniaturization of the semiconductor module. Further, since the device has a low power loss and a high efficiency, a highly efficient semiconductor module can be achieved.

Second Embodiment

In this embodiment, the main conversion circuit according to the first embodiment described above are applied to an electric power conversion device. Although the present invention is not limited to a specific electric power conversion device, a case where the present invention is applied to a three-phase inverter will be described below as a second embodiment.

Figure 4:
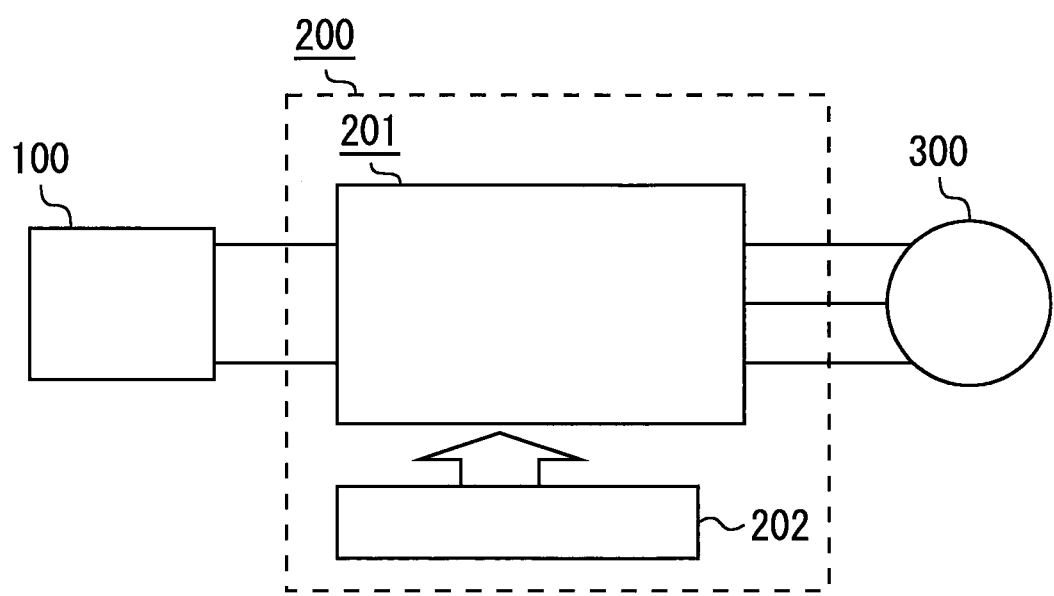
FIG. 4 is a block diagram illustrating a configuration of an electric power conversion system to which the electric power conversion device according to the embodiment is applied.

FIG. 4 is a block diagram illustrating a configuration of an electric power conversion system to which the electric power conversion device according to the embodiment is applied. This electric power conversion system includes a power supply 100, an electric power conversion device 200, and a load 300. The power supply 100 is a DC power supply and supplies DC power to the electric power conversion device 200. The power supply 100 can be composed of various components. For example, the power supply 100 can be composed of a DC system, a solar cell, or a storage battery, or may be composed of a rectifier or an AC/DC converter, which is connected to an AC system. Alternatively, the power supply 100 may be composed of a DC/DC converter that converts DC power output from a DC system to predetermined power.

The electric power conversion device 200 is a three-phase inverter connected to a node between the power supply 100 and the load 300, converts DC power supplied from the power supply 100 into AC power, and supplies the AC power to the load 300. The electric power conversion device 200 includes a main conversion circuit 201 that converts DC power into AC power and outputs the AC power, and a control circuit 202 that outputs a control signal for controlling the main conversion circuit 201 to the main conversion circuit 201.

The load 300 is a three-phase electric motor that is driven by AC power supplied from the electric power conversion device 200. The load 300 is not limited to a specific application. The load is used as an electric motor mounted on various electric devices, such as an electric motor for, for example, a hybrid vehicle, an electric vehicle, a railroad vehicle, an elevator, or an air-conditioner.

The electric power conversion device 200 will be described in detail below. The main conversion circuit 201 includes a switching device and a reflux diode (not illustrated). When the switching device is switched, the main conversion circuit 201 converts DC power supplied from the power supply 100 into AC power, and supplies the AC power to the load 300. The main conversion circuit 201 may have various types of specific circuit configurations. The main conversion circuit 201 according to this embodiment is a two-level three-phase full-bridge circuit, which can be composed of six switching devices and six reflux diodes connected in antiparallel with the respective switching devices. Each switching device of the main conversion circuit 201 is composed of the transistors 9 and 10 corresponding to the first embodiment described above. Every two switching devices of the six switching devices are connected in series and constitute a vertical arm. Each vertical arm constitutes each phase (U-phase, V-phase, W-phase) of the full-bridge circuit. Output terminals of each vertical arm, i.e., three output terminals of the main conversion circuit 201, are connected to the load 300.

Further, the main conversion circuit 201 includes a drive circuit (not illustrated) that drives each switching device. The drive circuit corresponds to the gate driver 13 according to the first embodiment described above and generates a drive signal for driving each switching device of the main conversion circuit 201, and supplies the generated drive signal to a control electrode of each switching device of the main conversion circuit 201. Specifically, the drive circuit outputs, to the control electrode of each switching device, a drive signal for turning on each switching device and a drive signal for turning off each switching device, according to the control signal output from the control circuit 202, which is described later. When the ON-state of each switching device is maintained, the drive signal is a voltage signal (ON signal) having a voltage equal to or higher than a threshold voltage of the switching device. When the OFF-state of each switching device is maintained, the drive signal is a voltage signal (OFF signal) having a voltage equal to or lower than the threshold voltage of the switching device.

The control circuit 202 controls each switching device of the main conversion circuit 201 so as to supply a desired power to the load 300. Specifically, the control circuit 202 calculates a period (ON period), in which each switching device of the main conversion circuit 201 is in the ON state, based on the power to be supplied to the load 300. For example, the main conversion circuit 201 can be controlled by a PWM control for modulating the ON period of each switching device depending on the voltage to be output. Further, the control circuit 202 outputs a control command (control signal) to the drive circuit 202 so that the ON signal is output to each switching device to be turned on and an OFF signal is output to each switching device to be turned off at each point. The drive circuit 202 outputs the ON signal or OFF signal, as the drive signal, to the control electrode of each switching device according to the control signal.

In the electric power conversion device according to this embodiment, the main conversion circuit according to the first embodiment is used as the main conversion circuit 201. Therefore, the electrical performance and reliability of the transistor is improved and thus it is possible to improve the reliability and the service life of the main conversion circuit.

While this embodiment illustrates an example in which the present invention is applied to a two-level three-phase inverter, the present invention is not limited to this and can be applied to various electric power conversion devices. While this embodiment illustrates a two-level electric power conversion device, the present invention can also be applied to a three-level or multi-level electric power conversion device. When power is supplied to a single-phase load, the present invention may be applied to a single-phase inverter. The present invention can also be applied to a DC/DC converter or an AC/DC converter when power is supplied to a DC load or the like.

Further, in the electric power conversion device to which the present invention is applied, the above-mentioned load is not limited to an electric motor. For example, the load may also be used as a power supply device for an electric discharge machine, a laser beam machine, an induction heating cooker, or a non-contact device power feeding system. More alternatively, the electric power conversion device may be used as a power conditioner for a photovoltaic power generating system, an electricity storage system, or the like.

A power conversion device to which the present invention is applied is applicable to a moving body. Since the present invention can enhance the reliability and the service life of the power conversion device, it is possible to achieve enhancement in the reliability and the service life of the moving body.

REFERENCE SIGNS LIST 1 semiconductor device; 13 gate driver; 14 high voltage-side gate wire; 16 low voltage-side gate wire; 200 electric power conversion device; 201 main conversion circuit; 202 control circuit

The invention claimed is:

1. A main conversion circuit comprising:
   a plurality of semiconductor devices connected in parallel with each other;
   a gate driver supplying a gate voltage to gates of the plurality of semiconductor devices; and
   a gate wire sequentially connected to the gates of the plurality of semiconductor devices from the gate driver,
   wherein an energizing ability of each of the semiconductor devices indicates how easily collector current flows in response to the supplied gate voltage, and
   the plurality of semiconductor devices having a lower energizing ability are connected closer to the gate driver.

2. The main conversion circuit according to claim 1, wherein the plurality of semiconductor devices having a larger collector-emitter saturation voltage are connected closer to the gate driver.

3. The main conversion circuit according to claim 1, wherein the plurality of semiconductor devices having a larger gate threshold voltage are connected closer to the gate driver.

4. The main conversion circuit according to claim 1, wherein the plurality of semiconductor devices having a larger conduction start time delay are connected closer to the gate driver.

5. The main conversion circuit according to claim 1, wherein the plurality of semiconductor devices are made of a wide-band-gap semiconductor.

6. The main conversion circuit according to claim 1, wherein in the plurality of semiconductor devices, an AC output terminal is provided in one end in a longitudinal direction of a casing, a positive voltage input terminal and a negative voltage input terminal are provided in the other end of the casing, and the gate is provided between the AC output terminal and the positive voltage input terminal or the negative voltage input terminal.

7. An electric power conversion device comprising:
   the main conversion circuit according to claim 1 converting input power and outputting converted power; and
   a control circuit outputting a control signal for controlling the main conversion circuit to the main conversion circuit.

8. A moving body comprising the electric power conversion device according to claim 7.

* * * * *